United States Patent [19]
Sakuma et al.

[11] Patent Number: 5,714,945
[45] Date of Patent: Feb. 3, 1998

[54] BIDIRECTIONAL COMMUNICATION METHOD FOR CATV SYSTEM

[75] Inventors: Kazushi Sakuma; Masahiko Kawasaki; Takashi Nozaki, all of Tokyo, Japan

[73] Assignee: Pioneer Electronic Corporation, Tokyo, Japan

[21] Appl. No.: 255,792

[22] Filed: Jun. 7, 1994

Related U.S. Application Data

[63] Continuation of Ser. No. 847,397, Mar. 6, 1992, abandoned.

[30] Foreign Application Priority Data

Mar. 7, 1991 [JP] Japan ................... 3-068004

[51] Int. Cl.$^6$ ................................. H04Q 1/00
[52] U.S. Cl. ................ 340/825.54; 340/825.08; 455/4.1
[58] Field of Search ................ 340/825.08, 825.54, 340/825.07, 825.52, 825.14; 455/4.1, 4.2; 348/6

[56] References Cited

U.S. PATENT DOCUMENTS

| | | | |
|---|---|---|---|
| 4,680,582 | 7/1987 | Mejia | 340/825.14 |
| 4,691,202 | 9/1987 | Denne et al. | 340/825.54 |
| 4,724,478 | 2/1988 | Masuko et al. | 455/4.1 |
| 4,742,335 | 5/1988 | Vogt | 340/825.08 |
| 4,942,572 | 7/1990 | Picard | 340/825.08 |
| 4,947,162 | 8/1990 | Kimura | 340/825.08 |
| 5,053,883 | 10/1991 | Johnson | 340/825.52 |
| 5,177,739 | 1/1993 | Basnuevo et al. | 340/825.08 |
| 5,194,846 | 3/1993 | Lee et al. | 340/825.08 |

*Primary Examiner*—Brian Zimmerman
*Attorney, Agent, or Firm*—Nikaido Marmelstein Murray & Oram LLP

[57] ABSTRACT

An exciting command is transmitted from a center of a CATV system to a plurality of terminals in a block at the same time for exciting circuits in each terminal. A command to request each of the terminals to send response data is transmitted from the center to the terminals in sequence after excitation of the circuits. In response to the command, each of the terminals sends response data to the center.

6 Claims, 4 Drawing Sheets

BIDIRECTIONAL COMMUNICATION METHOD FOR CATV SYSTEM

This application is a continuation of application Ser. No. 07/847,397 filed Mar. 6, 1992 now abandoned.

FIELD OF THE INVENTION

The present invention relates to a bidirectional communication method for a CATV system, and more particularly to a method of communicating with a plurality of terminals for polling which is a method of calling the terminals in sequence from a center to allow each in turn to transmit information data on hand.

BACKGROUND OF THE INVENTION

In the CATV system, every terminal has an unique address set by a local center of the CATV system. The polling is performed as follows.

The center sends a command signal including an address data and a command data to every terminal and receives a response signal including response-data from every addressed terminal in sequence. The terminal sends the data by a proper method, for example by a frequency shift keying (FSK) signal or a phase shift keying (PSK) signal.

Referring to FIG. 5, the center sends sequentially a demand signal including command data requesting a response to terminals 1, 2, 3 of subscribers, and each of the terminals sends a response signal including response data to the center. By continuing the communication in sequence, the center receives response data of all subscribers.

FIG. 7 shows an FSK modulation circuit provided in the terminal for modulating response data by the FSK to produce the response signal to be transmitted to the center. The FSK modulation circuit comprises an LPF (low pass filter) 4, a level regulator 5, a buffer 6, and a VCO (voltage-controlled oscillator) 7. The output signal of the VCO 7 is fed to a PD (phase detector) 9 through a frequency divider 8.

In the circuit, the VCO 7, frequency divider 8 and PD 9 compose a PLL (phase-locked loop). In the waiting state, the VCO 7 oscillates at a predetermined waiting frequency other than frequencies for communication so as not to disturb the communication frequencies. When a command signal is applied to the terminal from the center, a response data is applied to the VCO 7 through LPF 4, level regulator 5 and buffer 6. When the response data is applied to the VCO 7, the PLL operates. Namely, the PD 9 compares the divided output signal from the frequency divider 8 with a reference signal supplied from a reference signal generator 10. The compared signal is applied to the VCO 7 and added to the input signal thereto. Thus, the frequency of the output of the VCO is stabilized to a predetermined frequency value for carrying an upstream signal after a stabilizing time determined by a time constant of the PLL.

On the other hand, the response data (1 and 0), as the upstream signal, varies with short periods. Consequently, the data are not influenced by the PLL having a long time constant, so that FSK upstream signal can be produced from the circuit.

The output signal is fed to a mixer 12 through a band pass filter 11. The input oscillating signal of the mixer is mixed with an oscillating signal from a local oscillator 12a. The mixed signal is transmitted to the center as an upstream signal through a band amplifier 13 and a matching circuit 14.

FIG. 6 shows a time chart for the polling. For example, in the terminal 1, the time necessary for receiving a downstream signal including a command data and for analyzing the data is 25 msec. as shown by a reference a of FIG. 6. The time required for activating the PLL is about 60 msec. as shown by a reference b. Accordingly, after 85 msec., the terminal 1 produces an upstream signal including response data. The time necessary for completing the transmitting of the upstream signal to the center is about 80 msec. as shown by a reference d.

After the receiving of the upstream signal from the terminal 1, the center sends a downstream signal to the terminal 2 in the same manner. Thus, the center performs sequentially communication with all terminals.

As aforementioned, since the time for stabilizing the PLL is about 60 msec., the time for communicating with one terminal is 25 msec+60 msec+80 msec=165 msec. If the center is connected to the 10,000 terminals, the time for the polling is 165 msec×10,000=27.5 minutes.

Accordingly, it takes a long time to receive data, such as the-search for viewing rate, from all terminals. As a result, the received data are defective in reliability.

SUMMARY OF THE INVENTION

An object of the present invention is to provide a communication system which can shorten the time for performing the bidirectional communication, thereby obtaining reliable data from terminals.

According to the present invention, there is provided a method of transmitting signals between a center and a plurality of terminals in a CATV system comprising, transmitting a first command including an exciting command from the center to a plurality of terminals in a first block at the same time for exciting circuits in each terminal, transmitting a second command including a command to request each of the terminals to send response data from the center to the terminals in sequence after excitation of the circuits, and transmitting response data from the terminals to the center through a selected frequency channel for response.

In an aspect of the invention, another first command is sent from the center to a plurality of other terminals which are in a second block during the transmitting of the response data from the terminals in the first block to the center.

The other objects and features of this invention will become understood from the following description with reference to the accompanying drawings.

DETAILED DESCRIPTION OF THE PREFERRED EMBODIMENT

Figure 1:
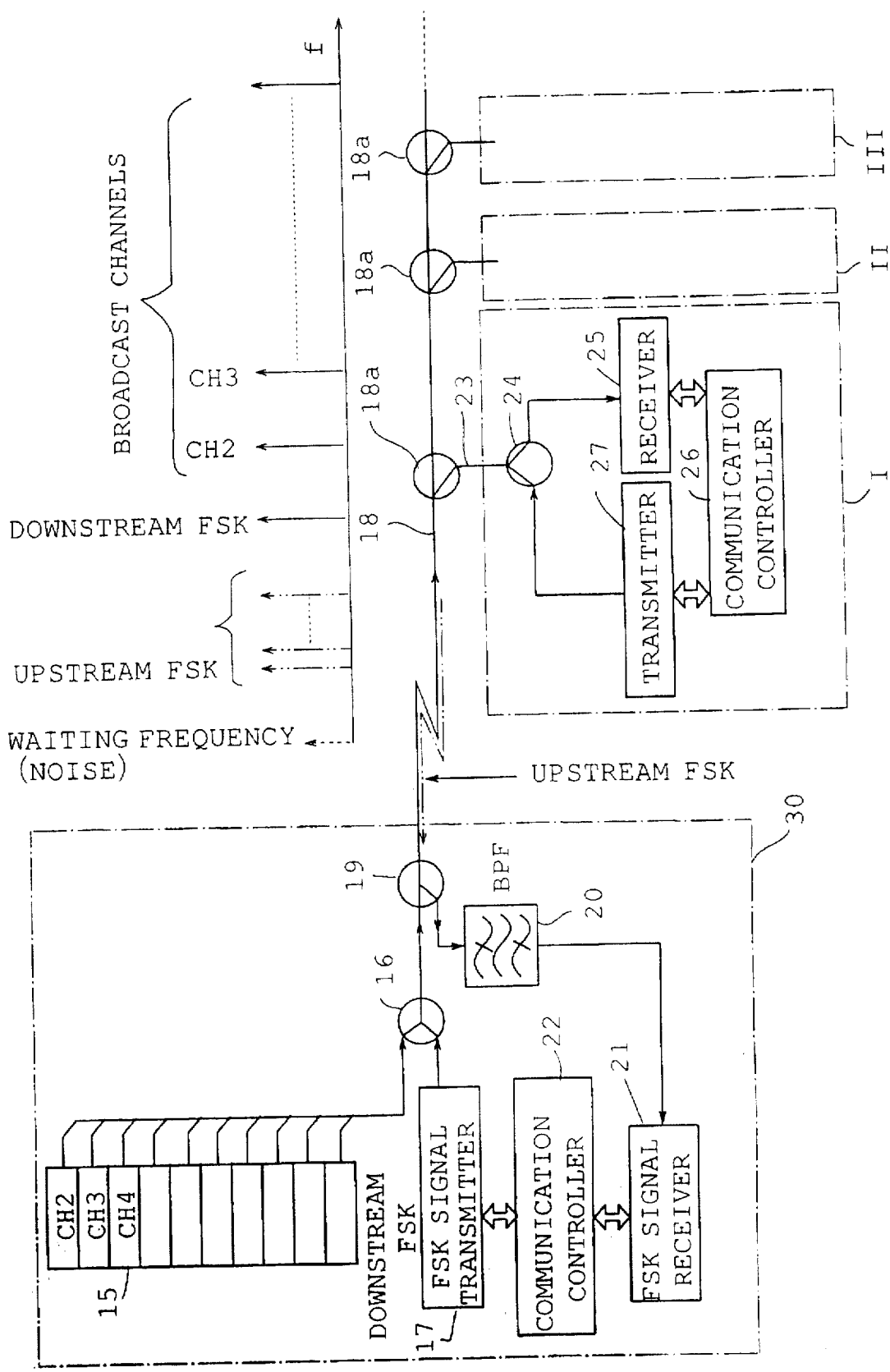
FIG. 1 is a block diagrams showing a bidirectional communication system of a CATV according to the present invention.

Referring to FIG. 1 showing a bidirectional communication system of the CATV to which the present invention is applied, a center 30 has a TV transmitter 15 for producing TV signals of broadcasting channels CH2, CH3 ..., a mixer 16 applied with the channel signals, an FSK signal transmitter 17, an FSK signal receiver 21 for receiving upstream FSK signals each including a response signal, and a communication controller 22 for controlling the transmitter 17 and the receiver 21, respectively. The transmitter 17 is controlled for producing a downstream FSK signal including a command which is applied to the mixer 16. In the mixer 16, the downstream FSK signal is mixed with a frequency band other than the broadcasting channels CH2 to CH10. The mixed signal is fed on a line 18 through a directional coupler 19. The line 18 is connected to terminals I, II, III ... for transmitting the FSK signal to the terminals.

In FIG. 1, vertical arrows arranged on the horizontal arrow represent the spectrum in which the horizontal abscisa represents frequency and the ordinate represents level of signal.

The directional coupler 19 is further connected to the receiver 21 through a BPF (band pass filter) 20 for receiving the FSK signal from the terminal. The receiver 21 is controlled by the communication controller 22 for extracting the FSK signal from the terminal.

Each of the terminals I, II, III ... has a distributor 24 connected to a directional coupler 18a provided on the line 18 through a lead wire 23. The terminal I is further provided with a receiver 25, a transmitter 27, and a communication controller 26 for controlling the receiver 25 and the transmitter 27, respectively. A television receiver and an operational box (not shown) are provided on the terminal.

Figure 7:
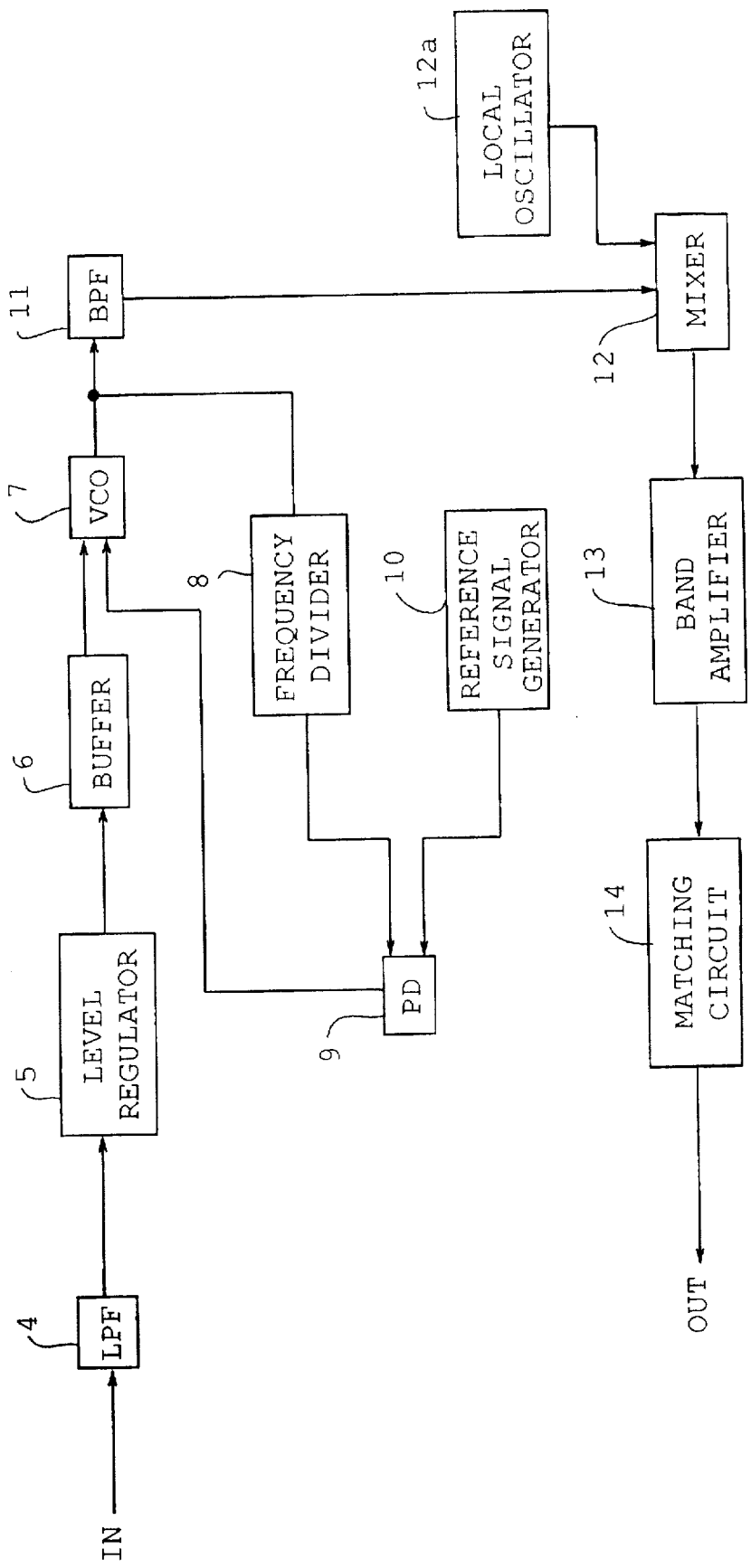
FIG. 7 is a block diagram of a circuit provided in a terminal of the CATV system.

The FSK signal from the center 30 is transmitted to the receiver 25 of the terminal through the line 18, directional coupler 18a, lead wire 23 and distributor 24. The receiver 25 is controlled by the communication controller 26 for receiving various data signals. The controller 26 analyzes each data signal and produces response data which is applied to the transmitter 27. The transmitter 27 has the FSK modulation circuit shown in FIG. 7 and produces a response signal which is transmitted to the center 30 through the distributor 24, lead wire 23, coupler 18a and line 18.

Figure 2:
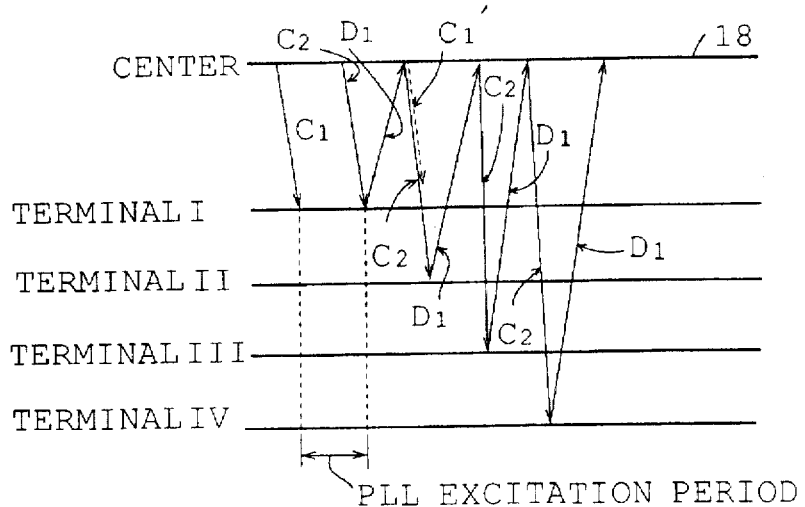
FIG. 2 is a schematic diagram showing a mode of the bidirectional communication.

The operation of the bidirectional communication system is described with reference to FIG. 2.

In the system, terminals I to IV compose one block. The center produces a command to request data having an exciting command C1 for exciting the PLL. The exciting command C1 is transmitted to the all terminals I to IV at the same time by commonly addressing the terminals as one block so as to excite the terminals all at once. After the excitation of the terminals I to IV, a command C2 to request response data is transmitted to the terminals I to IV in sequence (i.e., the terminals are individually addressed within the block), and each terminal produces a response data D1 which is transmitted to the center in sequence. During receiving the data, the center produces a command C1' for the terminals of the next block (See U.S. Pat. No. 4,716,410 which describes how terminals can be sequentially interrogated and yet commonly addressed).

Figure 3:
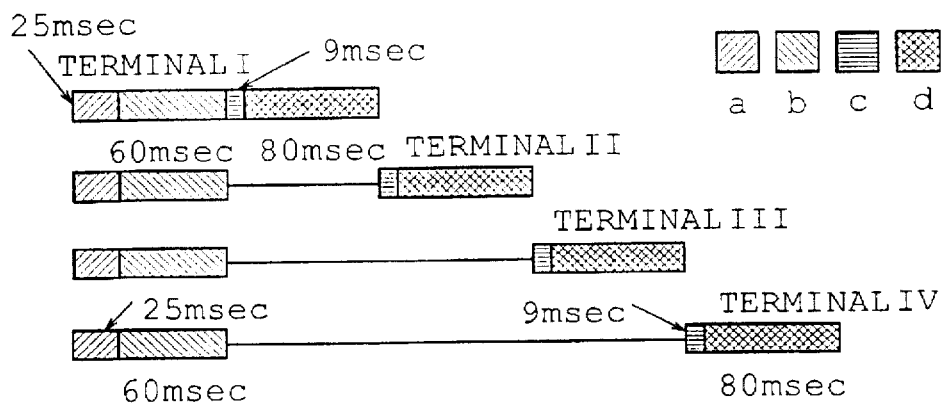
FIG. 3 is an explanatory diagram showing a time chart for the bidirectional communication.
Figure 6:
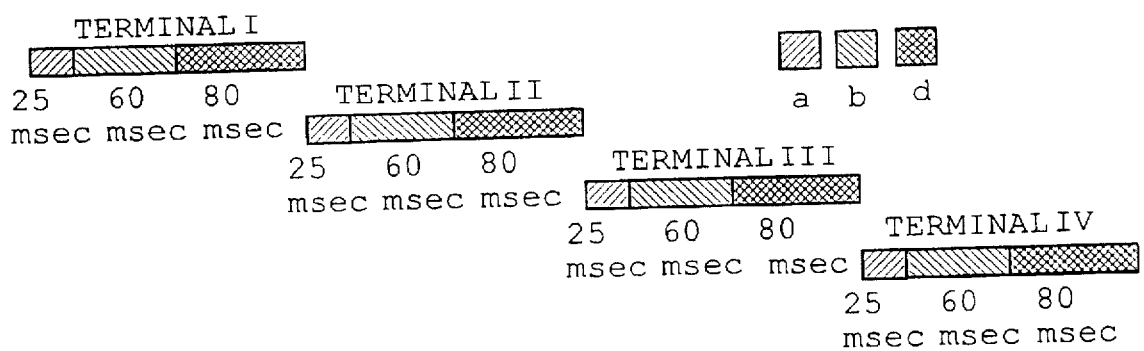
FIG. 6 is a schematic diagram showing a time chart for the polling of FIG. 5.

FIG. 3 shows a time chart for the polling of the present invention. The reference marks a, b and d represent the same times as FIG. 6. A reference mark c represents a time to address the terminals of the block and transmit the command C2 of request for response data D1 to the center, which is about 9 msec.

In the system, all terminals in the block are excited all at once for 85 msec. and the exciting command after 60 msec. of the first four terminals are masked. If the center is connected to 10,000 terminals, the time for the polling is 25 msec+60 msec+(9 msec+80 msec)×10,000=890085 msec. Accordingly, the time for the polling per one terminal is 89 msec. Thus, the time is reduced by 76 msec (165 msec−89 msec=76 msec) compared with the time of the conventional system. The time for the polling of 10,000 terminals is reduced by about 76 msec×10,000=12.7 minutes.

Figure 4:
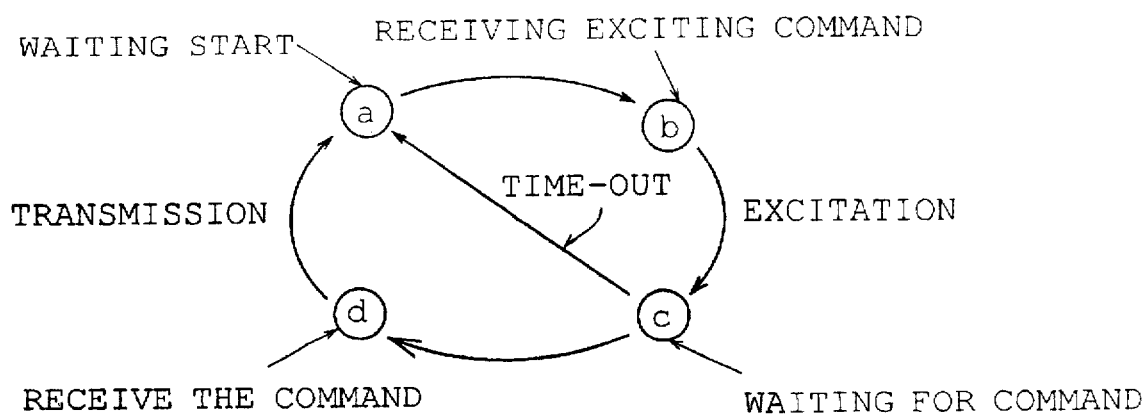
FIG. 4 is a schematic diagram showing transition of an operation of a terminal.
Figure 5:
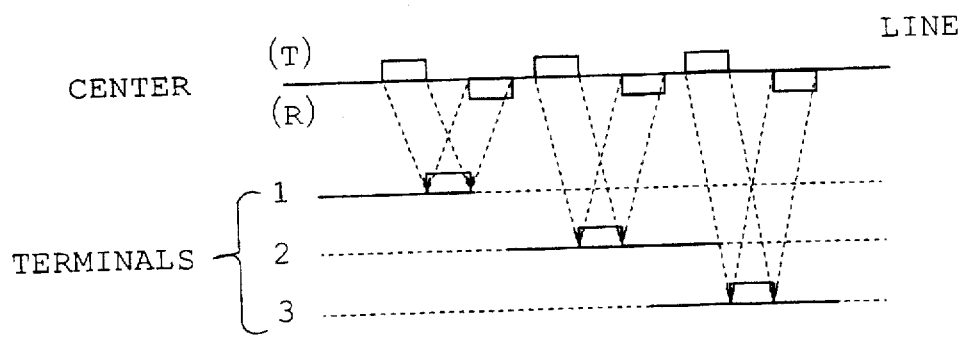
FIG. 5 is a schematic diagram showing a polling in a conventional CATV system.

FIG. 4 shows the transition of the operation of the terminal having a time-out control. When the transmission ends, the terminal returns to a waiting state (a) where the frequency of the PLL returns to a waiting frequency. However, if the command of request to send data is not received in the terminal for some reason after the predetermined time from receiving the exciting command, the terminal returns to the waiting state (a) by the time-out control, thereby preventing the increase of confluence noises by the continuation of the exciting state.

In a modified method of the present invention, there is provided a plurality of channels for each terminal to transmit a response data to the center, and one of the channels is designated by the center. Thus, pollings for a plurality of terminals in different blocks can be performed at the same time.

In accordance with the present invention, since a predetermined number of the terminals are excited all at once, the time to excite the terminals is extremely reduced, thereby shortening the time for the polling. Consequently, the time to collect the data in the center is reduced, improving the reliability of the viewing data from the terminals.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of transmitting signals from a center to a plurality of terminals in a CATV system each of the terminals having a receiver and a transmitter which has an oscillating circuit having a phase lock loop (PLL), said method comprising the steps of:

transmitting a first command, including an exciting command, from said center to a plurality of terminals in a first block at the same time, said first command exciting said oscillating circuit having said phase lock loop in each terminal;

transmitting in sequence a series of second commands after an interval after transmitting the first command and prior to receiving a response, the interval being set for a first terminal in the first block and being equal to an amount of time required for stabilizing said oscillating circuit to a predetermined frequency for sending an upstream signal to said center, the second command includes a command to request that each of the terminals sends response data by said transmitter to the center; and receiving, at said center, response data from the terminals.

2. A method according to claim 1 further comprising, transmitting another first command from the center to a plurality of other terminals which are in a second block during the reception of the response data from the terminals in the first block.

3. A method according to claim 1 wherein each of the first command and the second command further includes address information to designate a terminal.

4. The method according to claim 1, wherein the center transmits the first command to a second block during receiving the response data from the first block.

5. A method according to claim 1 wherein a plurality of frequency channels are available for said center for reception of response data from the terminals, and at least one of the first command and the second command further including a command for designating one of the frequency channels for the reception.

6. A method of transmitting signals from a center to a plurality of terminals in a CATV system each of the terminals having a receiver and a transmitter which has an oscillating circuit having a phase lock loop (PLL) for sending an upstream signal to the center at a predetermined sending frequency, the oscillating circuit being such that an exciting time for the PLL is necessary to go from a waiting state to a stabilized state where the oscillating circuit oscillates at the sending frequency, the method comprising the steps of:

transmitting a first command, including an exciting command for oscillating the oscillating circuit at said sending frequency, from said center to a plurality of terminals in a first block at a same time;

transmitting in sequence to each terminal a second command, said transmitting in sequence starting immediately after an interval which is equal to the exciting time after transmitting the first command, the second command including a command to request that each terminal sends response data by said upstream signal to the center; and receiving, at said center, response data from the terminals.

* * * * *